Aug. 18, 1931.     P. M. CONTANT     1,819,149
HOT WATER TREATMENT
Filed Oct. 19, 1928
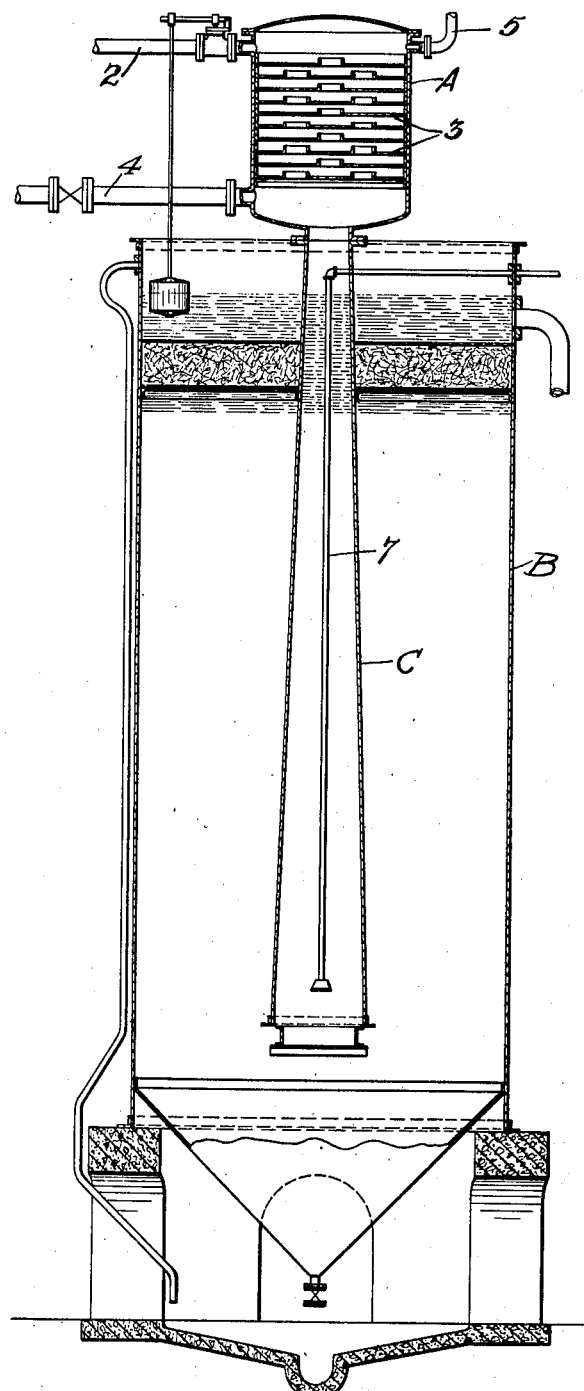
INVENTOR
BY *P. M. Contant*
*Nathaniel Frucht*
his ATTORNEY.

Patented Aug. 18, 1931

1,819,149

UNITED STATES PATENT OFFICE

PETER M. CONTANT, OF NEW YORK, N. Y., ASSIGNOR TO NECKAR WATER SOFTENER CORPORATION, OF NEW YORK, N. Y., A CORPORATION OF NEW YORK

HOT WATER TREATMENT

Application filed October 19, 1928. Serial No. 313,562.

My present invention relates to a process of treating water to remove or replace undesirable substances.

In treating water for this purpose, various methods may be used, such as chemical treatment and combined chemical treatment and heating. The present invention has particular reference to a reduction in consumption of the necessary chemicals for effecting the desired treatment.

Further objects and advantages will be readily apparent from the detailed description and the accompanying figure showing an elevation in section of the preferred structural embodiment of the invention.

Water containing undesirable impurities is led into a water heater A through inlet pipe 2, a float controlled valve regulating the flow. Within the heater are a series of shelves 3 receiving the water in sequence, a valve controlled steam supply pipe 4 supplying steam for heating the descending water. A vent 5 permits escape of gases resulting from this heat treatment, and of uncondensed steam.

As the water descends, it leaves the heater A and enters a reaction chamber C in the treatment or reaction tank B. The heating of the water will bring about certain changes in composition of the water, especially with respect to gases and solids in solution. Time is an important factor in this process, since the changes occur gradually. The reaction chamber C is therefore given such dimensions that the water remains in this chamber for a sufficiently long period to obtain the maximum results of the heat treatment.

The partially purified water before leaving the reaction chamber C receives a regulated supply of chemicals through chemical feed pipe 7 from a chemical supply tank suitably disposed in relation to the reaction tank B, and the remaining impurities are precipitated by the resulting chemical reaction. In view of the relatively long exposure of the water to the heat treatment, the quantity of chemicals required for the final treatment is reduced to a minimum.

A typical example of the improved process, as applied to boiler feed water, is the reduction of calcium bicarbonate in raw water to normal carbonate by removal of the half-bound carbon dioxide, and the removal of free carbon dioxide. Heating will remove the half-bound carbon dioxide in accordance with the following equation:

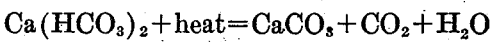
$$Ca(HCO_3)_2 + heat = CaCO_3 + CO_2 + H_2O$$

and most of the carbonate will be precipitated since normal carbonate is much less soluble than the bicarbonate. The carbon dioxide will be driven off until the quantity remaining corresponds to the solubility of the gas at the water temperature, provided sufficient time is available.

After the water has been heated for a sufficient time, lime is added to the water to produce a reaction as follows:

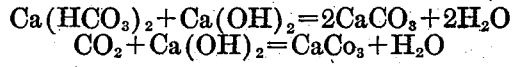
$$Ca(HCO_3)_2 + Ca(OH)_2 = 2CaCO_3 + 2H_2O$$
$$CO_2 + Ca(OH)_2 = CaCO_3 + H_2O$$

The addition of the lime after the water has been heat treated for a sufficiently long time results in a considerable saving of the chemicals necessary to complete the treatment.

I claim:

1. In a water purification system, a reaction tank, a preheating tank, a conduit for supplying water to be purified to said preheating tank, a second conduit supplying heating fluid to said preheating tank to cause heat reaction of said water and precipitation of impurities, a third conduit for conducting the heated water to the reaction tank, said conduit being of sufficient length to permit substantially complete heat reaction of said water, and a fourth conduit supplying chemicals to the heat reacted water adjacent the point of communication of the third conduit with the reaction tank to complete the purification.

2. In a water purification system, a heating tank, a conduit for supplying heating fluid thereto, a heat reaction chamber receiving the heated water from said heating tank, a treatment tank receiving the heated water from said heat-reaction chamber, and means for supplying chemicals to said water adjacent the point of communication of the heat reaction chamber with the treatment tank.

3. In a water purification system, a heating tank, a conduit for supplying heating fluid thereto, a heat reaction chamber receiving the heated water from said heating tank, a treatment tank receiving the heated water from said heat-reaction chamber, means for supplying chemicals to said water adjacent the point of communication of the heat reaction chamber with the treatment tank, and means for filtering the water in said treatment tank.

4. In a water purification system, a heating tank, means for supplying heat thereto, a treatment tank, a tubular heat reaction chamber immersed in said treatment tank and receiving heated water from said heating tank at one end thereof and discharging the water to the treatment tank at the other end thereof, and means for supplying chemicals to the water adjacent the point of communication of the heat reaction chamber with the treatment tank.

In testimony whereof I affix my signature.

PETER M. CONTANT.